(No Model.)
A. BRADLEY.
WAGON SCALE.
No 603,937.          Patented May 10, 1898.
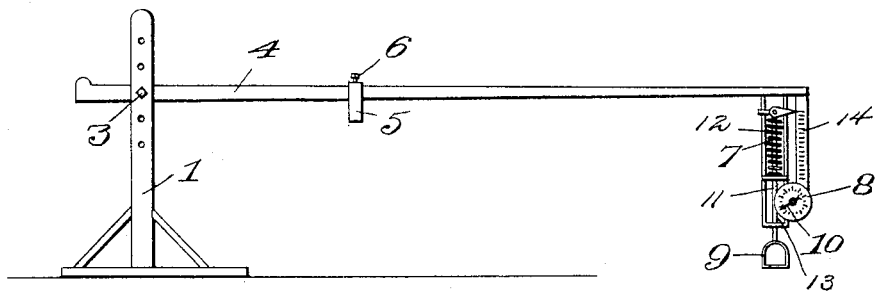
Witnesses
Harry W. Hahn
Victor J. Evans
Inventor
Allen Bradley.
By John Wedderburn
Attorney

UNITED STATES PATENT OFFICE.

ALLEN BRADLEY, OF FLORIS, VIRGINIA.

WAGON-SCALE.

SPECIFICATION forming part of Letters Patent No. 603,937, dated May 10, 1898.

Application filed June 26, 1897. Serial No. 642,481. (No model.)

*To all whom it may concern:*

Be it known that I, ALLEN BRADLEY, of Floris, in the county of Fairfax and State of Virginia, have invented certain new and useful Improvements in Wagon-Scales; and I do hereby declare the following to be a full, clear, and exact description of the invention, such as will enable others skilled in the art to which it appertains to make and use the same.

My invention relates to wagon-scales; and its object is to provide an improved form of wagon-scale that will be readily adapted to be used to weigh any wagon.

My invention consists of certain novel features of construction and combinations of parts hereinafter fully described and claimed.

The accompanying drawing is a side elevation of my device.

The numeral 1 indicates the standard of my device, which is provided with a series of openings therethrough. A beam 4 is fulcrumed upon said standard by means of a bolt 3 passing through one of said openings. It will thus be seen that it is possible to adjust the height of said beam. A balance-weight 5 is carried upon said beam and is held to slide thereon, being secured in any desired position by means of a set-screw 6. A spring-scale 7 is held upon the outer end of said beam. A dial 8 is held upon said scale. A stirrup 9 is attached to the pointer of said scale in such manner that when said stirrup is pressed down the pointer will be drawn along the scale, provided the scale be held stationary. A pointer 10, carried upon said dial, is connected by means of multiplying mechanism with the pointer upon the scale, in order to indicate smaller differences of weight than are indicated by said scale.

The pointer of the spring-scale 7 is attached to a stem 11, to the lower end of which the said stirrup 9 is secured, and at its upper portion the said stem is surrounded by a coiled spring 12. The lower part of the said stem at one edge is formed with a series of teeth 13, which are adapted to mesh with the multiplying-gear of the dial 8, the latter being supported relatively to the scale 7 by a scale-bar 14, depending from the outer end of the beam 4. The pointer of the scale 7 plays over the scale-bar 14, and the latter is graduated to represent pounds, increasing by hundreds, while the dial 8 is divided to represent units and tens. The balance-weight 5 is adjustable on the beam 4 for the purpose of increasing or decreasing the raising purchase of the said beam.

When it is desired to use my device, the standard is placed near one of the wheels of the wagon, the end of the beam is placed under the hub, and the stirrup forced down until the wheel is lifted. The scale will then register the weight upon that wheel. In like manner the weight upon the remaining wheels may be taken.

This device will be found very convenient in weighing railroad-cars and locomotives, as well as in weighing common wagons. Its usefulness upon a railroad will be apparent to every railroad-engineer, as it is a very efficient device for the purpose indicated.

Having thus described my invention, what I claim as new, and desire to secure by Letters Patent, is—

1. In a scale of the character set forth, the combination of a supporting-standard, a beam adjustably held by said standard and having a scale-bar depending from the outer end thereof with a dial on the lower portion thereof, and a spring-scale also depending from said beam and comprising a pointer with a spring-actuated stem having a stirrup at the lower end thereof, said stem being provided with teeth to engage the operating devices of the dial, substantially as described.

2. In a scale, the combination of a standard having a series of openings therethrough, a scale-beam adjustably mounted upon said standard and having a balance-weight thereon, a spring-scale comprising a pointer and a stirrup at the outer end of the said scale-beam, the said pointer and stirrup being connected to each other, and a scale-bar over which said pointer has movement and having at the lower end thereof a dial, of a rotary scale adapted to be actuated by the movement of the connection between the pointer and the stirrup, substantially as described.

In testimony whereof I have signed this specification in the presence of two subscribing witnesses.

ALLEN BRADLEY.

Witnesses:
G. L. LEWIS,
AGNES E. LEWIS.